(12) United States Patent
Nebhrajani et al.

(10) Patent No.: US 10,073,799 B1
(45) Date of Patent: Sep. 11, 2018

(54) PROGRAMMABLE DATA WIDTH CONVERTER DEVICE, SYSTEM AND METHOD THEREOF

(71) Applicant: Synopsys, Inc., Mountain View, CA (US)

(72) Inventors: Vijay A. Nebhrajani, Maharashtra (IN); Sanket Naik, Bangalore (IN)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/876,752

(22) Filed: Jan. 22, 2018

(30) Foreign Application Priority Data

Nov. 2, 2017 (IN) .............................. 201741039138

(51) Int. Cl.
*G06F 13/40* (2006.01)
*G05B 19/045* (2006.01)

(52) U.S. Cl.
CPC ....... *G06F 13/4018* (2013.01); *G05B 19/045* (2013.01)

(58) Field of Classification Search
CPC ...... G06F 13/38; G06F 13/40; G06F 13/4004; G06F 13/4018; G05B 19/02; G05B 19/04; G05B 19/045
See application file for complete search history.

(56) References Cited

U.S. PATENT DOCUMENTS

2008/0270650 A1* 10/2008 Bracamontes Del Toro ............... G06F 13/4022 710/105
2008/0270667 A1* 10/2008 Bracamontes Del Toro ............... G06F 13/4018 710/306
2017/0228327 A1* 8/2017 Mishra .................. G06F 13/161

* cited by examiner

*Primary Examiner* — Jason M Crawford
(74) *Attorney, Agent, or Firm* — Fenwick & West LLP

(57) ABSTRACT

The present disclosure pertains to a programmable data width converter device, system and method thereof. Programmable data width converter (pDWC) of the present disclosure can include a control Finite State Machine (FSM) that is configured to receive input values of m and n, and control any or a combination of L (Load Control Signal), S (Shift Control Signal), LL (Load Location Control Signal), and p (programmable shift value) based on the received values of m and n; and a loadable programmable shift register with programmable load location (pSRL) operatively coupled with the control FSM, wherein the pSRL is configured to perform loading and shifting functions based on the L, S, LL, and p values loaded by the control FSM. The pDWC can be configured to programmably convert width of m k-bit word input to n k-bit word output, and wherein $1 \leq m \leq M$ and $1 \leq n \leq N$.

13 Claims, 13 Drawing Sheets

PROGRAMMABLE DATA WIDTH CONVERTER DEVICE, SYSTEM AND METHOD THEREOF

FIELD OF THE INVENTION

The present disclosure relates generally to Integrated Circuit (IC) devices having circuitry with programmable functions and programmable interconnections, and more particularly, the present disclosure pertains to devices, systems, and methods for width conversion of data streams.

BACKGROUND

The background description includes information that may be useful in understanding present invention. It is not an admission that any of the information provided herein is prior art or relevant to the presently claimed invention, or that any publication specifically or implicitly referenced is prior art.

In digital circuit theory, sequential logic is a type of logic circuit whose output depends not only on the present value of its input signals but on the sequence of past inputs, the input history. This is in contrast to combinational logic, whose output is a function of only the present input. That is, sequential logic has state (memory) while combinational logic does not. As conventionally known, Shift Register (SR) is a type of sequential logic circuit that can be used for storage or transfer of data in the form of binary numbers. This sequential device loads data present on its inputs and then moves or "shifts" it to its output once every clock cycle, hence the name Shift Register. A SR basically consists of several single bit "D-Type Data Storage elements", one for each data bit, either a logic "0" or a "1", connected together in a serial type daisy-chain arrangement so that output from one data storage element becomes input of the next storage element and so on.

In digital circuits, a SR is a cascade of flip flops, sharing same clock, in which output of each flip-flop is connected to 'data' input of next flip-flop in the chain, resulting in a circuit that shifts by one position the 'bit array' stored in it, 'shifting in' the data present at its input and 'shifting out' the last bit in the array, at each transition of the clock input. Data bits may be fed in or out of a SR serially, that is one after the other from either the left or the right direction, or all together at the same time in a parallel configuration. The number of individual data storage elements required to make up a single SR device is usually determined by the number of bits to be stored with the most common being 8-bits (one byte) wide constructed from eight individual data storage elements. SRs are used for data storage or for movement of data and are therefore commonly used inside calculators or computers to store data such as two binary numbers before they are added together, or to convert the data from either a serial to parallel or parallel to serial format. Individual data storage elements that make up a single SR are all driven by a common clock signal making them synchronous devices.

Directional movement of data through a SR can be either to the left (left shifting) to the right (right shifting) left-in but right-out (rotation) or both left and right shifting within the same register, thereby making it bidirectional. FIG. 1A illustrates an exemplary working 100 of shift register as available in the prior-art. The effect of data movement from left to right through a SR can be presented graphically in FIG. 1A. Also, the directional movement of the data through a shift register can be either to the left (left shifting) to the right (right shifting) left-in but right-out (rotation) or both left and right shifting within the same register thereby making it bidirectional. However, because data must be retrieved one bit at time, it also takes N clocks to retrieve N bits of data stored in an N-bit SISO shift register. The 4-bit shift register requires 4 clocks to retrieve the 4 bits stored in it. Thus, the conventional SRs need to be made configurable and re-configurable such that they are more precise in data storage and transfer of the data and meet the requirement of real time dynamic nature of operations.

Conventionally known, programmable logic device (PLD) is an electronic component used to build reconfigurable digital circuits. PLD is any IC that has programmable functions and programmable interconnections. PLD commonly includes one or more data paths, or collections of digital signals routed through the system during processing. Size of a collection, called the "data width" or "data path width" herein, depends on a number of factors. One factor in determining data path width is significance of signals (i.e., information that the signals represent, and the format of the signals). Another factor is the required speed of operation of the design. Yet another factor relates to size constraints introduced by the design. Other factors may also possibly affect data path width. In some cases, it may be desirable to modify the width of a data path at some point in the design, changing the extent to which data is propagated in parallel. This may be necessary, for example, because of different operating speeds in different portions of the design, or different constraints on the data width in different portions of the design. It may also be beneficial for this data width modification to be programmable and to be done dynamically. It would therefore be desirable to have a PLD capable of implementing a variable-width data path.

There is therefore a need in the art for programmable data width conversion that efficiently reduces the number of flops, and also reduces latency that is associated with reduced number of flops. Further, there is also a need to provide an improved system, device, and method that includes storage capable of ensuring that all combinations of bits fit in the storage without any left over. Furthermore, there is also a need to provide an improved programmable data width converter capable of achieving aforementioned needs arriving with the growth and development of the technology.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

SUMMARY

The present disclosure relates generally to integrated circuit (IC) devices having circuitry with programmable functions and programmable interconnections, and more particularly, the present disclosure pertains to devices, systems, and methods for width conversion of data streams.

It may be appreciated that, for understanding of the subject matter, a load register having a fixed data width is referred to/denoted as "M" hereinafter, a load register having a variable data width is referred to/denoted as "m" hereinafter, a read register having a new fixed data width is referred to/denoted as "N" hereinafter, a read register having a new variable data width is referred to/denoted as "n" hereinafter, and the number of sample bits is referred to as "k" hereinafter.

The present disclosure provides a new, cost-effective, technically advanced and improved programmable data width converter (pDWC) that serves as a storage device for data streams. In an embodiment, the proposed pDWC ensures that all combinations of {m, n} bits fit in the storage so as to allow a user to always write-in n (m×k)-bit words, and read-out m (n×k)-bit words. The proposed pDWC enables writing-in of n (m×k)-bit words and reading-out of m (n×k)-bit words in at least (k×(M+N)) flops with the least possible latency. Thus, the proposed pDWC not only efficiently reduces the number of flops, but also reduces latency associated with such reduced number of flops. Further, the proposed pDWC includes storage capable of ensuring that all combinations of {m, n} bits fit in the storage without any left over.

An aspect of the present disclosure relates to a programmable data width converter (pDWC) that includes a control Finite State Machine (FSM), and a loadable programmable shift register (pSR) with programmable load location (complete register (pSR with programmable load location) being hereinafter referred to as pSRL). The control Finite State Machine (FSM) receives input values of m and n, and controls any or a combination of L (Load Control Signal), S (Shift Control Signal), LL (Load Location Control Signal), and p (programmable shift value) based on the received values of m and n. The loadable programmable shift register with programmable load location (pSRL) is operatively coupled with the control FSM, and is configured to perform loading and shifting functions based on the L, S, LL, and p values loaded by the control FSM.

In an aspect, the pDWC is configured to programmably convert width of m k-bit word input to n k-bit word output, and wherein 1≤m≤M and 1≤n≤N (M and N being any positive integers).

In an aspect, the pSRL can be loaded based on value of the LL, and by setting L=1, and wherein the pSRL can be shifted by setting S=1 in a manner such that data is loaded in m bits and read out in n bits.

In an aspect, the pSRL is at least M+N bits wide. In another aspect, the p is equal to n. In an aspect, the pSRL is any of a right shift register or a left shift register. In another aspect, the LL defines where data D is loaded.

In an aspect, the pSR can be configured to receive a programmable input LL that defines where data D is to be loaded from the Load Register when L (Load Control Signal)=1.

In an aspect, the load register width is M bits, and wherein m bits of said load register are used.

In an aspect, the control FSM loads at least n bits into the pSRL that has width W where W≥(M+N), and wherein if m>n, only one load is required, else if m<n, multiple load cycles are required with S=0. In another aspect, the control FSM keeps a count C of bits that are currently in the pSRL, wherein each load increments the C by m such that when C≥n has been loaded into the pSRL, the control FSM initiates a shift that shifts out n bits and decrements C by n. In yet another aspect, when a load and shift happen together, (m−n) is added to C, and wherein whenever a free space exists in the pSRL as defined by (W−C)≥(m−n), the control FSM performs a load cycle, and wherein when L=S=1, loading happens while shifts are going on.

In an aspect, the pDWC is a k-bit pDWC with the control FSM being operatively coupled with either a large pSRL allowing m and n to be integral multiples of k, or being operatively coupled to control k single-bit pSRLs in parallel.

In an aspect, the pDWC requires a minimum or exactly equal to k×(M+N) number of flops. In another aspect, the pDWC has a width that is a greater than or exactly equal to k×(M+N)

In an aspect, the pSR with programmable load location (pSRL) comprises a bit-re-mapper function δ that receives L (Load Control Signal), S (Shift Control Signal), LL (Load Location Control Signal), and p (programmable shift value), and based on n (n+1):1 multiplexers and $p_i'$, outputs a load vector, wherein $p_i'=(LL-1)$ when ((L=1, S=0) and (LL≤i)), else if (S=1), $p_i'=p+i$, else $p_i'=i$.

In an aspect, the pSRL receives the L (Load Control Signal), the S (Shift Control Signal), the LL (Load Location Control Signal), and the p (programmable shift value) from any or combination of a control Finite State Machine (FSM), a programmable logic device (PLD), or a software application.

In an aspect, if L=1 and S=0, $\delta_i=D_{i-LL}$ if LL≤i≤min (n, (LL+m)), else $\delta_i=d_i$. In another aspect, if L=0 and S=1, $\delta_i=d_{i+p}$ if i<(n−p), else $\delta_i=0$. In yet another aspect, when L=1 and S=1, $\delta_i=d_{i+p}$ if i<LL, else $\delta_i=D_{i-LL}$ if LL≤i≤min (n, (LL+m)), else $\delta_i=0$. In still another aspect if L=0 and S=0, $\delta_i=d_i$.

An aspect of the present disclosure relates to a method for programmably converting width of m k-bit word input into n k-bit word output by a programmable data width converter (pDWC). The method includes the steps of receiving, by a control Finite State Machine (FSM), input values of m and n; controlling, by the control FSM, any or a combination of L (Load Control Signal), S (Shift Control Signal), LL (Load Location Control Signal), and p (programmable shift value) based on the received values of m and n; converting programmably, by the pDWC, width of 'm' k-bit word input to 'n' k-bit word output, and wherein 1≤m≤M and 1≤n≤N; and performing, by a loadable programmable shift register with programmable load location (pSRL) operatively coupled with the control FSM, loading and shifting functions based on the L, S, LL, and p values loaded by the control FSM. In an aspect, if load and shift happen together, (m−n) is added to C.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure, and wherein:

FIG. 9 illustrates an exemplary block diagram of a proposed multi-bit programmable data width converter (pDWC), in accordance with an embodiment of the present invention.

DETAILED DESCRIPTION OF THE INVENTION

Figure 1A:
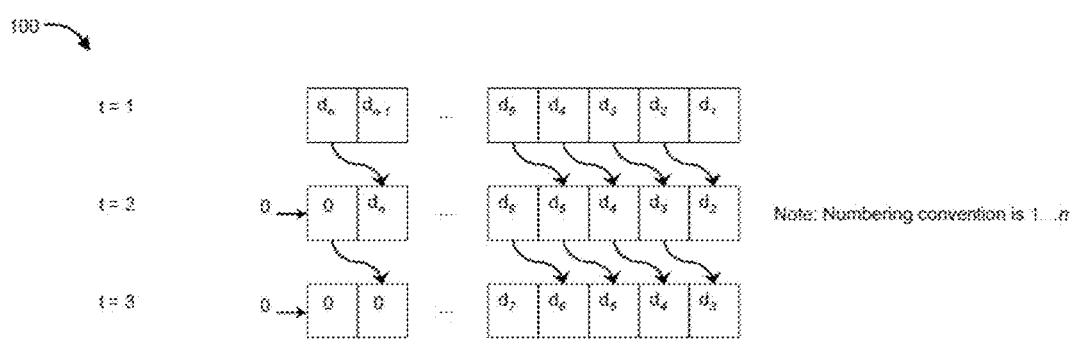
FIG. 1A illustrates an exemplary working of shift register as available in the prior-art.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure relates generally to integrated circuit (IC) devices having circuitry with programmable functions and programmable interconnections, and more particularly, the present disclosure pertains to devices, systems, and methods for width conversion of data streams.

In order to solve the technical problems as recited in the background above, the present disclosure provides a new, cost-effective, technically advanced and improved programmable data width converter (pDWC) that serves as a storage device for data streams. In an embodiment, the proposed pDWC ensures that all combinations of bits fit in the storage so as to allow a user to always write-in n (m×k)-bit words, and read-out m (n×k)-bit words. The proposed pDWC enables writing-in of n (m×k)-bit words and reading-out of m (n×k)-bit words in at least (k×(M+N)) flops with the least possible latency. Thus, the proposed pDWC not only efficiently reduces the number of flops, but also reduces latency associated with the reduced number of flops. Further, the proposed pDWC includes storage capable of ensuring that all combinations of {k×m, k×n} bits fit in the storage without any left over.

An aspect of the present disclosure relates to a programmable data width converter (pDWC) that includes a control Finite State Machine (FSM) and a loadable programmable shift register with programmable load location (pSRL). The control Finite State Machine (FSM) receives input values of m and n, and controls any or a combination of L (Load Control Signal), S (Shift Control Signal), LL (Load Location Control Signal), and p (programmable shift value) based on the received values of m and n, wherein the loadable programmable shift register with programmable load location (pSRL) is operatively coupled with the control FSM and is configured to perform loading and shifting functions based on the L, S, LL, and p values loaded by the control FSM. In an aspect, the pDWC is configured to programmably convert width of m k-bit word input to n k-bit word output, and wherein $1 \leq m \leq M$ and $1 \leq n \leq N$ (M and N being any positive integers).

In an aspect, the pSRL can be loaded based on value of the LL, and by setting L=1, and wherein the pSRL can be shifted by setting S=1 in a manner such that data is loaded in m bits and read out in n bits.

In an aspect, the pSRL is at least M+N bits wide. In another aspect, the p is equal to n. In an aspect, the pSRL is any of a right shift register or a left shift register. In another aspect, the LL defines where data D is loaded.

In an aspect, the pSR can be configured to receive a programmable input LL that defines where data D is to be loaded from the Load Register when L (Load Control Signal)=1.

In an aspect, the load register width is M bits, and wherein m bits of said load register are used.

In an aspect, the control FSM loads at least n bits into the pSRL that has width W where $W \geq (M+N)$, and wherein if m>n, only one load is required, else if m<n, multiple load cycles are required with S=0. In another aspect, the control FSM keeps a count C of bits that are currently in the pSRL, wherein each load increments the C by m such that when $C \geq n$ has been loaded into the pSRL, the control FSM initiates a shift that shifts out n bits and decrements C by n. In yet another aspect, when a load and shift happen together, (m−n) is added to C, and wherein whenever a free space exists in the pSRL as defined by $(W-C) \geq (m-n)$, the control FSM performs a load cycle, and wherein when L=S=1, loading happens while shifts are going on.

In an aspect, the pDWC is a k-bit pDWC with the control FSM being operatively coupled with either a large pSRL allowing m and n to be integral multiples of k, or being operatively coupled to control k single-bit pSRLs in parallel.

In an aspect, the pDWC requires a maximum of k×(M+N) number of flops.

In an aspect, the pSR with programmable load location (pSRL) comprises a bit-remapper function δ that receives L (Load Control Signal), S (Shift Control Signal), LL (Load Location Control Signal), and p (programmable shift value), and based on n (n+1):1 multiplexers and $p_i'$, outputs a load vector, wherein $p_i'=(LL-1)$ when ((L=1, S=0) and (LL≤i)), else if (S=1), $p_i'=p+i$, else $p_i'=i$.

In an aspect, the pSRL receives the L (Load Control Signal), the S (Shift Control Signal), the LL (Load Location Control Signal), and the p (programmable shift value) from any or combination of a control Finite State Machine (FSM), a programmable logic device (PLD), or a software application.

In an aspect, if L=1 and S=0, $\delta_i = D_{i-LL}$ if $LL \leq i \leq \min(n, (LL+m))$, else $\delta_i = d_i$. In another aspect, if L=0 and S=1, $\delta_i = d_{i+p}$ if i<(n−p), else $\delta_i = 0$. In yet another aspect, when L=1 and S=1, $\delta_i = d_{i+p}$ if i<LL, else $\delta_i = D_{i-LL}$ if $LL \leq i \leq \min(n, (LL+m))$, else $\delta_i = 0$. In still another aspect if L=0 and S=0, $\delta_i = d_i$.

An aspect of the present disclosure relates to a method for programmably converting width of m k-bit word input into n k-bit word output by a programmable data width converter (pDWC). The method includes the steps of receiving, by a control Finite State Machine (FSM), input values of m and n; controlling, by the control FSM, any or a combination of L (Load Control Signal), S (Shift Control Signal), LL (Load Location Control Signal), and p (programmable shift value) based on the received values of m and n; converting programmably, by the pDWC, width of 'm' k-bit word input to n' k-bit word output, and wherein $1 \leq m \leq M$ and $1 \leq n \leq N$; and performing, by a loadable programmable shift register with programmable load location (pSRL) operatively coupled with the control FSM, loading and shifting functions based on the L, S, LL, and p values loaded by the control FSM. In an aspect, if load and shift happen together, (m−n), is added to C.

An aspect of the present disclosure relates to a programmable data width converter (pDWC) device comprising: a control finite state machine (FSM) circuitry communicably coupled with at least one programmable shift register (pSR) having a programmable load location input to allow programmable data width conversion. In an aspect, the control finite state machine (FSM) circuitry is adapted to generate an output to control at least one of loading (L) of data, shifting (S) of data, load location (LL) of data, and a programmable shift value (p) in the programmable shift register (pSR) based on an input data with a fixed data width or a variable data width.

In an aspect, the programmable load location input is configurable with a value that defines a location of data to be loaded in the pSR based at least on an output generated by the control finite state machine (FSM) circuitry.

In an aspect, the pSR includes a bit re-mapper module configured to shift out a programmable number of bits from a storage of the pSR based at least on an output generated by the control finite state machine (FSM) circuitry. In an aspect, the bit re-mapper module is configured to load the storage available in the pSR, upon shifting of the programmable number of bits, with a fixed number of bits at a variable load location.

An aspect of the present disclosure relates to a programmable data width converter (pDWC) device comprising a programmable circuitry having programmable functions and programmable interconnections. The pDWC includes a control finite state machine (FSM) module having an output to control at least one of loading (L) of data, shifting (S) of data, load location (LL) of data, and a programmable shift value (p), and a programmable shift register (pSR) adapted to receive the output of the FSM control module and data from a load register having a data width (M), wherein the programmable shift register (pSR) is configured to convert data received from the load register having a fixed data width (M) or variable data width (m) to a new fixed data width (N) or a new variable data width (n) based on the received output.

An aspect of the present disclosure relates to method for programmable data width conversion. The method includes the steps of generating, by a control finite state machine (FSM) module, an output to control at least one of loading (L) of data, shifting (S) of data, load location (LL) of data, and a programmable shift value (p) in a programmable shift register (pSR); receiving, by the pSR, output of the FSM control module and data from a load register having a data width (M); and converting, by the pSR, data received from the load register having a fixed data width (M) or variable data width (m) to a new fixed data width (N) or a new variable data width (n) based on the received output.

Figure 1B:
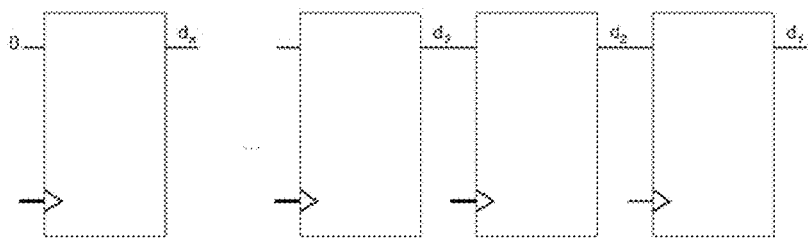
FIG. 1B illustrates an exemplary implementation of the exemplary shift register as available in the prior-art.

In digital circuits, a shift register is a cascade of flip flops, sharing the same clock, in which the output of each flip-flop is connected to the 'data' input of the next flip-flop in the chain, resulting in a circuit that shifts by one position the 'bit array' stored in it, 'shifting in' the data present at its input and 'shifting out' the last bit in the array, at each transition of the clock input. More generally, a shift register may be multidimensional, such that it's 'data in' and stage outputs are themselves bit arrays: this is implemented simply by running several shift registers of the same bit-length in parallel. FIG. 1A illustrates an exemplary working 100 of shift register as available in the prior-art. Even though FIG. 1A illustrates an example of simple n-bit right shift register (SR), both left and right shift registers are possible. As shown in FIG. 1A data ($d_n$, $d_{n-1}$ . . . $d_1$) shifts right by one bit every clock (t) (or at every successive time instant). FIG. 1B illustrates an exemplary implementation 150 of the exemplary shift register (SR) as available in the prior-art. As shown in FIG. 1B, the SR is a chain of flip flops wherein an output of each is connected to the input of another. The input of the $n^{th}$ flop is 0. As recited in FIG. 1A and as implemented in FIG. 1B with every clock cycle, the data "shifts" to right flip flop. However, it may be appreciated from the above implementation that in such circuits if a new data could be loaded into the flops, to be shifted out subsequently, the circuit becomes a new circuit (referred to as a loadable SR) which is an improved and more useful circuit.

Figure 2A:
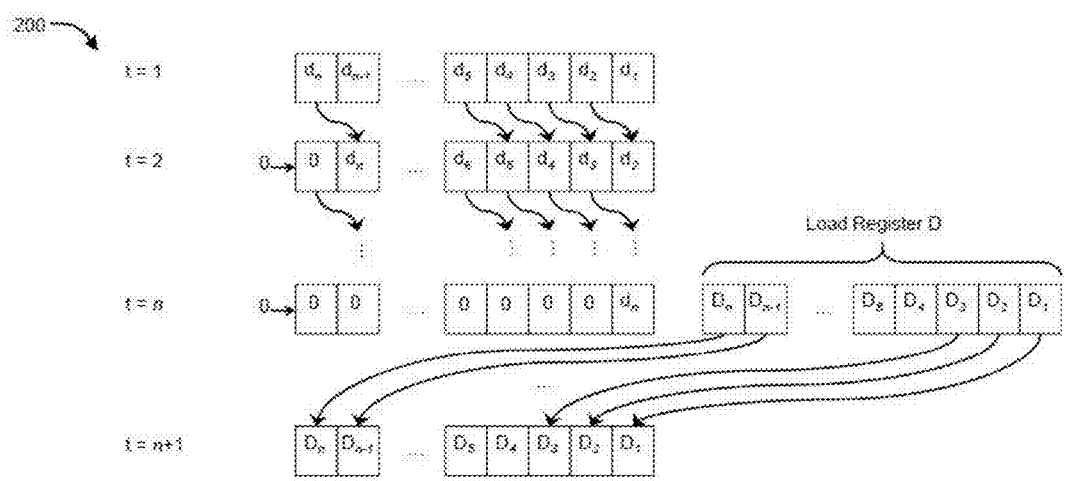
FIG. 2A illustrates an exemplary working of a loadable shift register as available in the prior-art.
Figure 2B:
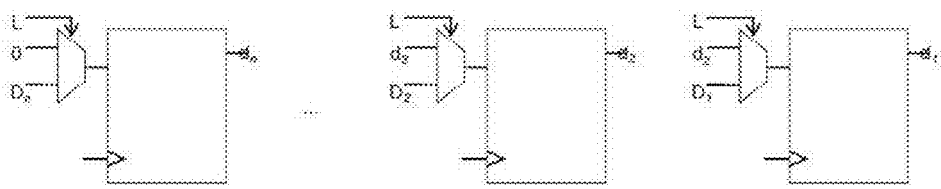
FIG. 2B illustrates an exemplary implementation of the exemplary loadable shift register as available in the prior-art.

Accordingly, FIG. 2A illustrates an exemplary working 200 of a loadable shift register as available in the prior-art. The loadable shift registers are same as shift registers illustrated in FIGS. 1A-B, however with an ability to load n-bit parallel data after n shifts. The loadable shift register works as a parallel to serial converter (a well known circuit). FIG. 2B illustrates an exemplary implementation 250 of the exemplary loadable shift register (SR) as available in the prior-art. To make a generic loadable SR, a signal "L" that loads a new value when high can be used/introduced/provided, and terminal count of shifts can be used to drive this signal, or it can come from some other pre-defined/pre-configured condition. Referring to FIG. 2B, in the implementation, L can be driven by the terminal count of a modulo-n counter. It may be observed that, when L=1, the value of D is loaded into the flops, whereas when L=0, the flops constitute a simple shift right register.

Figure 3A:
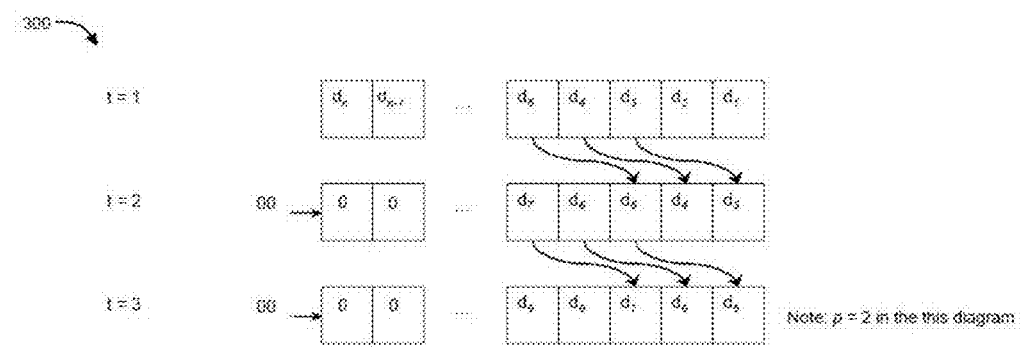
FIG. 3A illustrates an exemplary working of a programmable shift register as available in the prior-art.
Figure 3B:
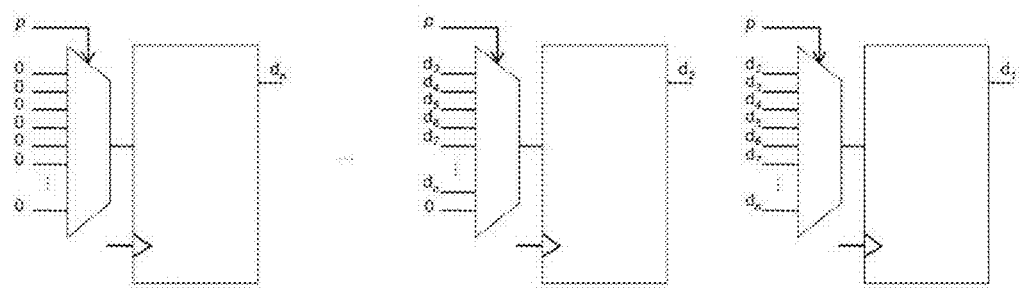
FIG. 3B illustrates an exemplary implementation of the exemplary programmable shift register as available in the prior-art.

FIG. 3A illustrates an exemplary working 300 of programmable shift register (pSR) as available in the prior-art which is an advanced SR when compared to the loadable shift register. The programmable shift register (SR) allows p-bit shifts of data at a time, so the data shifts right or left by p bits every clock (or at every successive time instant). In this case, "p" is received/retrieved from configuration register bits, and is thus programmable. In an example, as shown in FIG. 3A, the curved arrows point "p" bits to the right (here p=2). FIG. 3B illustrates an exemplary implementation 350 of the exemplary programmable shift register as available in the prior-art. In the implementation as shown in FIG. 3B, each bit needs an (n−1)-bit to 1-bit multiplexer (the select lines of which connect to p). If p∈{1, 2, 3 . . . n} is considered in an implementation, it means that, p=0 cannot be considered for this implementation. Such implementation is an un-optimized implementation.

Figure 4A:
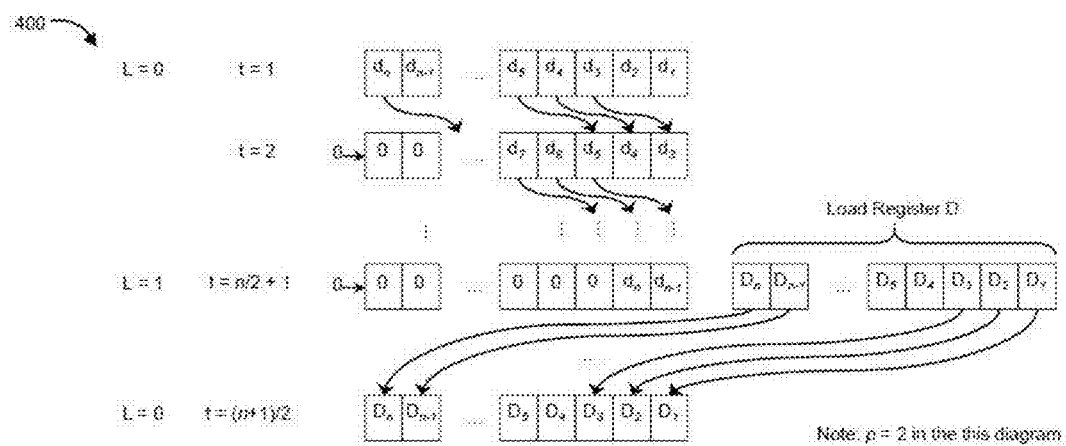
FIG. 4A illustrates an exemplary behavioral diagram of a loadable programmable shift register (pSR) as available in the prior-art.
Figure 4B:
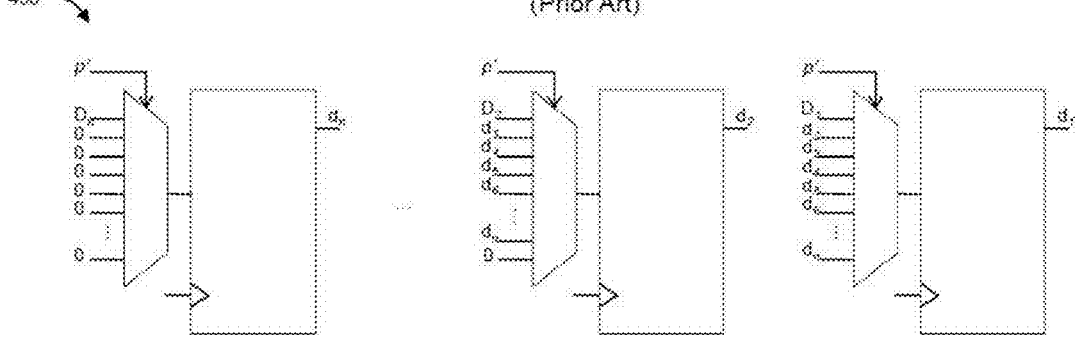
FIG. 4B illustrates an exemplary implementation of the loadable programmable shift register 'pSR' as available in the prior-art.

FIG. 4A illustrates an exemplary behavioral diagram 400 of a loadable programmable shift register (pSR) as available in the prior-art which is an advanced SR when compared to the programmable shift register. The loadable programmable shift registers are same as a shift register, however with an ability to load n-bit parallel data when L=1 (here p=2). FIG. 4B illustrates an exemplary implementation 450 of the loadable programmable shift register (pSR) as available in the prior-art. Since the implementation of programmable shift register (pSR) is discussed in FIG. 3B, in order to implement the exemplary loadable programmable shift register, a 2:1 load multiplexer is merged with the (n−1):1 multiplexer which can be used for achieving programmable shift. In order to achieve this, there is a requirement of n:1 multiplexer or even p=0 to imply loading can be used; i.e., if L=1, make p=0, and by using a derived signal p' to drive the mux select lines, given by p'=(p∧~L) (where "∧" is a Logical AND). It may be appreciated that, for this scenario, select lines are numbered from 0, unlike data which is numbered from 1.

Figure 4C:
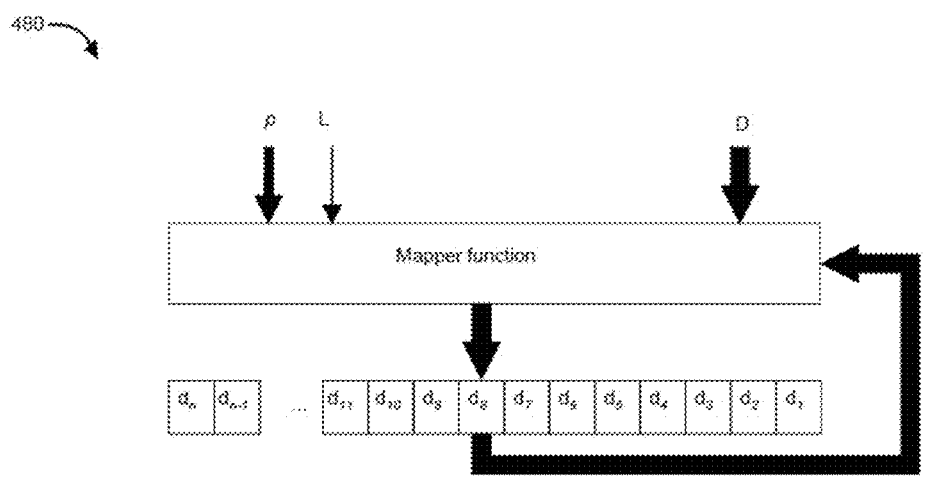
FIG. 4C illustrates an exemplary conceptual block diagram of the exemplary loadable programmable shift register as illustrated in FIGS. 4A-B with a mapper function as available in the prior-art.

FIG. 4C illustrates an exemplary conceptual block diagram 480 of the exemplary loadable programmable shift register as illustrated in FIGS. 4A-B with a mapper function as available in the prior-art. In an exemplary embodiment, the mapper function is utilized for re-mapping the re-interleaved data outputs into symbols and applying the re-mapped symbols iteratively to the mapper function (which operates as a decision filter).

As shown in FIG. 4C, the mapper function receives a data (D) from a load register along with a control signal for loading (L) of data, and a programmable shift value (p). In an exemplary embodiment, based on L and p, the data (D) is loaded in a register (not shown).

In the case of the Loadable pSR (as illustrated in FIGS. 4A-B and discussed above), the n:1 multiplexers and the logic for p' constitutes the mapper function. The output obtained from the mapper function may be referred to as a "load vector".

Accordingly, the load vector may be represented as below:

$$\text{load vector} = \begin{cases} D_i, & 1 \le i \le n, & L=1 \\ d_{i+p}, & 1 \le i \le (n-p) \\ 0, & p < i \le n \end{cases} \quad L=0$$

It may be noted that from the above representation that, L selection requires at least 2:1 multiplexers, so if L=1, the mapper function equals to D, or if L=0, the mapper function depends on value of p (since p can have at most (n−1) values, this translates to a (n−1):1 multiplexer as discussed above). In an exemplary embodiment, this output can be further p combined by using an n:1 multiplexer as before and generating p'.

Figure 5A:
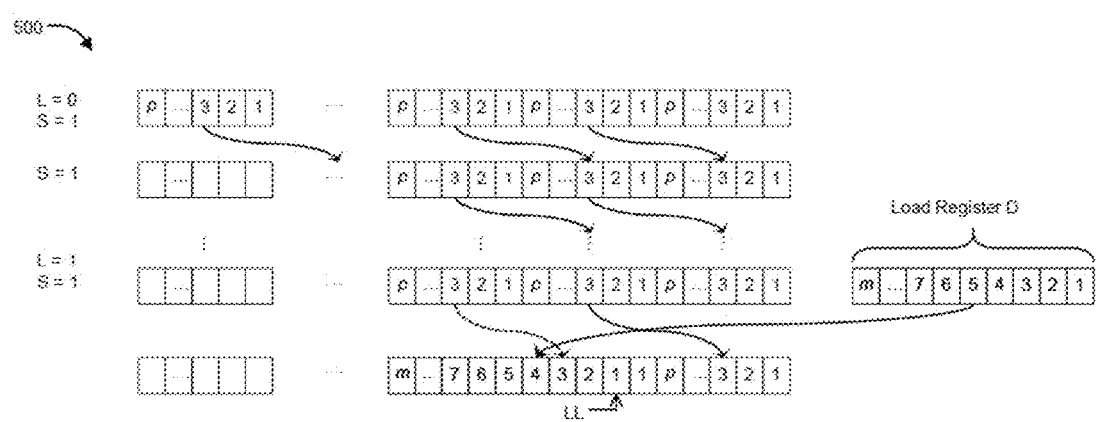
FIG. 5A illustrates an exemplary behavioral diagram of a proposed loadable programmable shift register with programmable load location (pSRL).

FIG. 5A illustrates an exemplary behavioral diagram of a proposed loadable programmable shift register with programmable load location (pSRL), which is an advanced SR when compared with the loadable programmable shift register (pSR). In an exemplary embodiment, the proposed pSRL is similar to a loadable pSR (as shown in FIGS. 4A-C), however the proposed pSRL accepts/receives an additional input Load Location (LL) that defines where the data "D" is to be loaded in the SR. Further, a signal "S" that controls shifting of the data is also accepted/received in the proposed pSRL. Accordingly, in an exemplary implementation, when S=1, a p-bit right shift is performed.

In an exemplary embodiment, a choice of "LL", as shown in FIG. 5A, overwrites data which can indicate that a load happens at whatever location LL points to when L=1, and a shift can happen concurrently with the load if S=1 at the same time. It may be appreciated that, even though this may not always be a useful scenario, such scenario may be useful in some cases and shall not restrict the scope of the present disclosure.

In an exemplary embodiment, a decision of load and shift in the pSRL can be decided based on a bit re-mapper (δ) 594 function. The bit re-mapper (δ) 594 function for pSRL can be evaluated as below:

if (L=1 and S=0) [LOAD OPERATION]

$$\delta_i = \begin{cases} D_{i-LL} & \text{if } LL \leq i \leq \min\{n, (LL+m)\} \\ d_i & \text{otherwise} \end{cases}$$

In this case, "$D_{i-LL}$" loads D from bit LL onwards till either m bits are loaded or space runs out, whereas, "d" holds state for other bits.

if (L=0 and S=1) [SHIFT OPERATION]

$$\delta_i = \begin{cases} d_{i+p} & \text{if } i < (n-p) \\ 0 & \text{otherwise} \end{cases}$$

In this case, "$d_{i+p}$" does a simple p-bit right shift for bits {p+1, p+2, ... n}, whereas, "0" loads 0's into any leftover bits.

if (L=1 and S=1) [LOAD and SHIFT OPERATION]

$$\delta_i = \begin{cases} d_{i+p} & \text{if } i < LL \\ D_{i-LL} & \text{if } LL \leq i \leq \min\{n, (LL+m)\} \\ 0 & \text{otherwise} \end{cases}$$

In this case, "$d_{i+p}$" does a simple p-bit shift for bits {1, 2, 3, ... (LL−1)}, which get the value of the bit p bits to their left, "$D_{i-LL}$" loads D from bit LL onwards till either m bits are loaded or space runs out, and "0" loads 0's into the leftover bits on the left.

if (L=0 and S=0) [NO OPERATION]

$$\delta_i = d_i$$

In this case, "$d_i$" holds state for all bits.
Where the function min is defined thus:

$$\min\{x_1, x_2\} = \begin{cases} x_1, & \text{if } x_1 < x_2 \\ x_2, & \text{otherwise} \end{cases}$$

Referring again to FIG. 5A i.e., exemplary behavioral diagram of a proposed loadable programmable shift register with programmable load location (pSRL) with the bit re-mapper (δ) 594, the load value for a few bits are considered:

Bit 1 could get the value of itself, one of (n−1) bits to its left, or only bit 1 of the load register, $D_1$—this is when LL=1. If LL>1, then loading happens to the left of bit 1 and $d_1$ stays uninvolved. This is a total of (n+1) values.

Similarly, bit 2 could get its own value, one of (n−2) bits to its left or only bits 1 and 2 of the load register ($D_1$ or $D_2$). It would get $D_1$ if LL=2, and it would get $D_2$ if LL=1. This is a total of (n+1) values.

Continuing, bit 3 could get its own value, one of (n−3) bits to its left or bits 1, 2 or 3 of the load register ($D_1$, $D_2$ or $D_3$). It would get $D_1$ if LL=3, $D_2$ if LL=2 and $D_3$ if LL=1. Once again, this is a total of (n+1) values.

Generically, bit r gets its own value, one of (n−r) bits to its left or one of r bits {1, 2, 3 r} of the load register—$D_1$, $D_2$, $D_3$ ... $D_r$. It gets $D_1$ if (LL=r), $D_2$ if LL=(r−1), $D_3$ if LL=(r−2) and so on. This is a total of (n+1) values. Thus, in general bit r gets the value of bit $D_{(r-LL+1)}$ if LL≤r. If LL>r, then bit r either may either get a shifted value or hold its previous value.

From above results it may be noted that, at most n (n+1):1 multiplexers are needed for the implementation. The multiplexer size starts reducing from the (n−m+1)$^{th}$ bit onwards because there are fewer bits on the left to choose from while shifting. The n$^{th}$ bit can only get its own value or one of m values from the load register, since it does not have bits on its left.

Figure 5B:
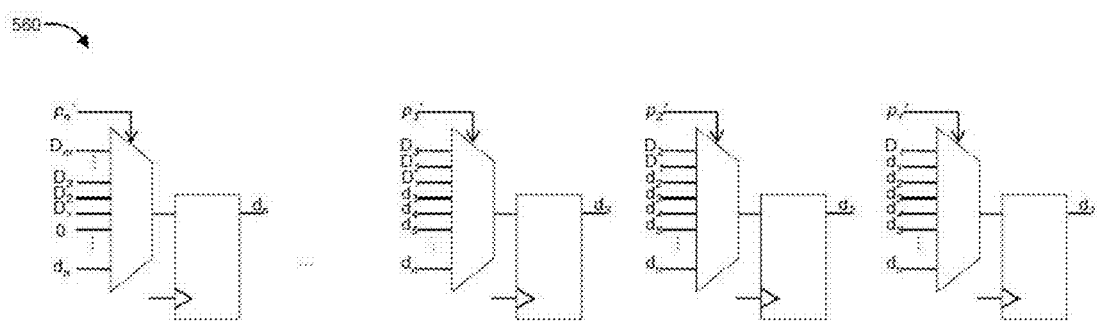
FIG. 5B illustrates an exemplary implementation of the proposed loadable programmable shift register with programmable load location (pSRL).

FIG. 5B illustrates an exemplary implementation of the proposed loadable programmable shift register with programmable load location (pSRL), in accordance with an embodiment of the present disclosure. In an embodiment, FIG. 5B illustrates the proposed loadable programmable shift register with an additional input that defines where data is loaded (pSRL).

It is to be appreciated that for the exemplary implementation purpose, $D_1$, $D_2$, $D_3$ ... etc. are connected in the reverse order of $d_2$, $d_3$, $d_4$ ... etc, which enables a simple way of realizing the expression (r−LL+1), since bit r will get the value of bit $D_{(r-LL+1)}$ from the load register while loading.

Figure 5C:
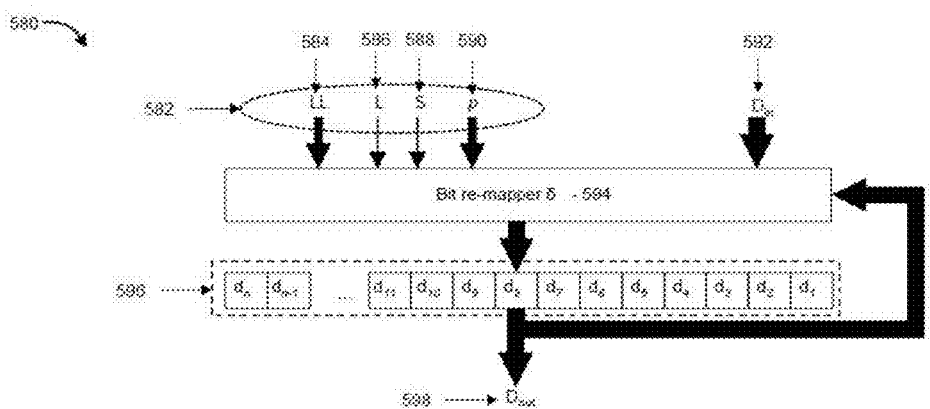
FIG. 5C illustrates an exemplary conceptual block diagram of the proposed loadable programmable shift register with programmable load location (pSRL) as illustrated in FIGS. 5A-B with a bit-remapper function ($\delta$).

In an exemplary embodiment, in an implementation, the proposed pSRL focuses on the way $p_i'$ is computed, wherein using the implementation as illustrated in FIG. 5C, for $p_i'$ generation for the pSRL:

| $p_1'$ is realized by: | if (L = 1, S = 0) and (LL ≤ 3): | | |
|---|---|---|---|
| if ((L = 1, S = 0) and (LL ≤ 1)) | LL | $p_1'$ | selects |
| $p_1'$ = (LL − 1) | 1 | 0 | $D_3$ |
| else if (S = 1) | 2 | 1 | $D_2$ |
| $p_1'$ = p + 1 | 3 | 2 | $D_1$ |
| else | else if (S = 1) | | |
| $p_1'$ = 1 | p | $p_1'$ | selects |
| | 1 | 4 | $d_4$ |
| | 2 | 5 | $d_5$ |
| | 3 | 6 | $d_6$ |
| | ... | ... | ... |
| | else | | |
| | X | 3 | $d_3$ |
| $p_2'$ is realized by | if (L = 1, S = 0) and (LL ≤ 2): | | |
| if ((L = 1, S = 0) and (LL ≤ 2)) | LL | $p_2'$ | selects |
| $p_2'$ = (LL − 1) | 1 | 0 | $D_2$ |
| else if (S = 1) | 2 | 1 | $D_1$ |
| $p_2'$ = p + 2 | else if (S = 1) | | |
| else | p | $p_2'$ | selects |
| $p_2'$ = 2 | 1 | 3 | $d_3$ |
| | 2 | 4 | $d_4$ |
| | 3 | 5 | $d_5$ |
| | ... | ... | ... |
| | else | | |
| | X | 2 | $d_2$ |
| $p_3'$ is realized by: | if (L = 1, S = 0) and (LL ≤ 3): | | |
| if ((L = 1, S = 0) and (LL ≤ 3)) | LL | $p_3'$ | selects |
| $p_3'$ = (LL − 1) | 1 | 0 | $D_3$ |
| else if (S = 1) | 2 | 1 | $D_2$ |
| $p_3'$ = p + 3 | 3 | 2 | $D_1$ |
| else | else if (S = 1) | | |
| $p_3'$ = 3 | p | $p_3'$ | selects |
| | 1 | 4 | $d_4$ |
| | 2 | 5 | $d_5$ |
| | 3 | 6 | $d_6$ |
| | ... | ... | ... |
| | else | | |
| | X | 3 | $d_3$ |

| $p_i'$ is realized by: | if (L = 1, S = 0) and (LL ≤ p): | | |
|---|---|---|---|
| if ((L = 1, S = 0) and (LL ≤ i)) | 1 | 0 | $D_p$ |
| $\quad p_i' = (LL - 1)$ | 2 | 1 | $D_{p-1}$ |
| else if (S = 1) | 3 | 2 | $D_{p-2}$ |
| $\quad p_i' = p + i$ | ... | ... | ... |
| else | p | p − 1 | $D_1$ |
| $\quad p_i' = i$ | else if (S = 1) | | |
| | p | $p_i'$ | selects |
| | 1 | 1 + p | $d_{p+1}$ |
| | 2 | 2 + p | $d_{p+2}$ |
| | 3 | 3 + p | $d_{p+3}$ |
| | ... | ... | ... |
| | else | | |
| | X | p | $d_p$ |

Thus, it may be noted form the above that, the n (n+1):1 multiplexers and $p_i'$ together defines the bit re-mapper function δ, which is a complete solution for a pSRL.

FIG. 5C illustrates an exemplary conceptual block diagram of the proposed loadable programmable shift register with programmable load location (pSRL) as illustrated in FIGS. 5A-B with a bit-remapper function (δ) 594, in accordance with an embodiment of the present disclosure. The proposed loadable programmable shift register includes with an additional input that defines where data is loaded (pSRL). Considering the above analysis representations and analysis, FIG. 5C illustrates the block diagram of pSRL. As shown in FIG. 5C, the bit-mapper function δ (also interchangeably referred to as bit-mapper δ 594) receives a data ($D_{in}$) from a load register having a data width (M) 592 along with at least one of control inputs 582 that control at least one of load location (LL) of data 584, loading (L) of data 584, shifting (S) of data 588, and a programmable shift value (p) 590. Based on which the data 596 is loaded in a register (not shown) to ultimately convert data received from the load register having a fixed data width (M) or variable data width (m) to the data 598 having a new fixed data width (N) or a new variable data width (n) based on the received output. It may be noted from the above that, FIG. 5C provides a generalized programmable shift register with programmable load location which serves as a storage.

In an exemplary embodiment, the proposed loadable programmable shift register with programmable load location (pSRL) 580 is provided. The pSRL being configured to receive a programmable input LL 584 that defines where data D is to be loaded from the Load Register when L (Load Control Signal)=1.

In an exemplary embodiment, the pSR with programmable load location (pSRL) includes a bit-remapper δ 594 function that receives L (Load Control Signal) 586, S (Shift Control Signal) 588, LL (Load Location Control Signal) 584, and p (programmable shift value 590, and based on n (n+1):1 multiplexers and $p_i'$, outputs a load vector, wherein $p_i'$=(LL−1) when ((L=1, S=0) and (LL≤i)), else if (S=1), $p_i'$=p+i, else $p_i'$=i.

In an exemplary embodiment, the pSRL receives the L (Load Control Signal), the S (Shift Control Signal), the LL (Load Location Control Signal), and the p (programmable shift value) from a control Finite State Machine (FSM).

In an exemplary embodiment, if L=1 and S=0, $δ_i=D_{i-LL}$ if LL≤i≤min (n, (LL+m)), else $δ_i=d_i$. In another aspect, if L=0 and S=1, $δ_i=d_{i+p}$ if i<(n−p), else $δ_i=0$. In yet another aspect, if L=1 and S=1, $δ_i=d_{i+p}$ if i<LL, else $δ_i=D_{i-LL}$ if LL≤i≤min (n, (LL+m)), else $δ_i=0$. In still another aspect, if L=0 and S=0, $δ_i=d_i$.

However, an enormous technical drawback with the programmable shift register with programmable load location is that because of this limited storage, there are always partial data (words) that are left over. Thus, there is need to manage these remainder partial data (words).

In an aspect, the present disclosure further provides a control finite state machine (FSM) that is operatively coupled with the programmable shift register with programmable load location (pSRL), which enables maintenance of reminder partial data (words) from the data ($D_{in}$) from a load register having a data width (M), and based on the reminder partial data (words), controls at least one of Load Control Signal (L) of data, a load location (LL) of data, a programmable shift value (p), and shifting (S) of data.

Figure 6:
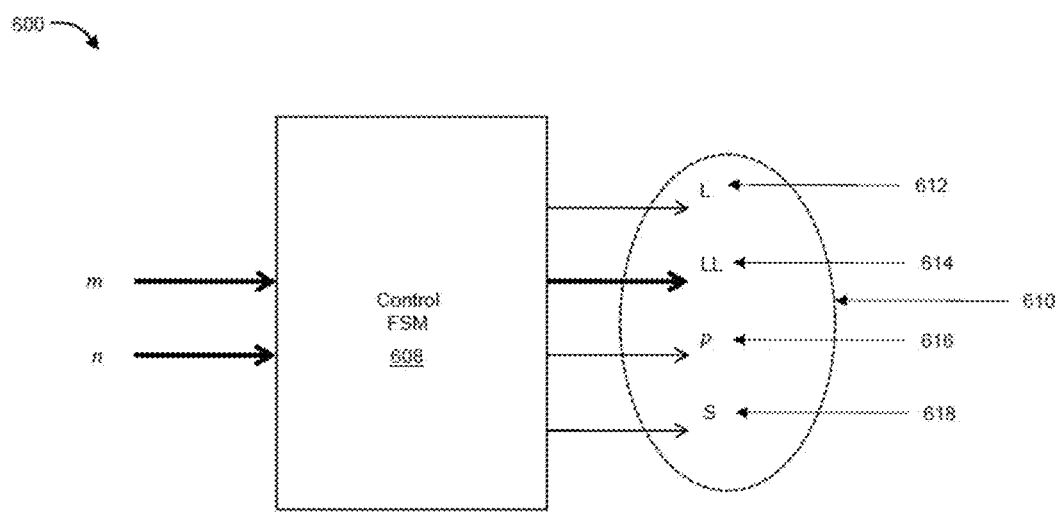
FIG. 6 illustrates an exemplary block diagram of a control finite state machine (FSM), in accordance with an embodiment of the present invention.

FIG. 6 illustrates an exemplary block diagram of a control finite state machine (FSM). As shown in FIG. 6, a control finite state machine (FSM) 608 is configured to maintain a record (count) of reminder partial data (words) m 604 and n 606 respectively, from the data ($D_{in}$) of a load register having a data width (M), and based on the reminder partial data (words) i.e. m 604 and n 606, controls at least one output 610 that includes Load Control Signal (L) 612, a Load Location Control Signal (LL) 614, a programmable shift value (p) 616, and a Shift Control Signal (5) 618.

In an exemplary embodiment, the pSRL of the present disclosure at specific times can be loaded (L) 612 by defining a value for the load location LL 614 and by setting L=1, and can be shifted (based on S) 618 at specific times by setting S=1. The data can be loaded and shifted in such a way that data is seamlessly loaded in m bits at a time, and read out n bits at a time, and p is set equal to n. In another exemplary embodiment, at one or more time instances, load 612 and shift 618 are concurrent, i.e., L=S=1.

In a preferred embodiment, in order to implement the above, a pSRL that is at least (M+N) bits wide can be used, wherein the programmable shift value p is set to be equal to n. In such scenario, the load register width is M bits, of which m bits are used and the rest discarded.

In an exemplary embodiment, the control FSM loads in at least n bits into the pSRL of width W, such that W≥(M+N), where 1≤m≤M and 1≤n≤N. In an implementation, if m≥n, this requires only one load. In another implementation, if m<n, this requires multiple load cycles with S=0.

In an exemplary implementation, the FSM keeps a count of bits (C) currently in the pSRL such that each load action/operation can increment C by m. Once sufficient data (C≥n) has been loaded into the pSRL, the Control FSM initiates shift operation so as to shift-out n bits. In this scenario, each shift decrements C by n.

In an exemplary implementation, if a load and a shift happen simultaneously, (m−n) is added to C. Whenever free space is detected in the pSRL i.e. whenever (W−C) is greater or equal to (m−n), the FSM performs a load cycle. It may be appreciated that pSRL can perform both, load as well as shift operations when L=S=1, wherein loading happens seamlessly while shifts are going on. The pSRL can load M bits at a time, wherein only m of these bits are valid.

Accordingly, based on above understanding, it may be appreciated that a pSRL when paired with the right Control FSM can efficiently allow programmable data width conversion. Considering this approach, the present disclosure provides a new and improved programmable data width converter (pDWC) having a pSRL paired with the right Control FSM that efficiently allows programmable data width conversion. In an exemplary embodiment, the pSRL can shift out a programmable number of bits, and can be loaded with a fixed number of bits at a variable load location. As long as the loading and shifting happen in a controlled fashion, a pSRL together with a Control FSM provides the programmable Data Width Converter (pDWC).

Figure 7:
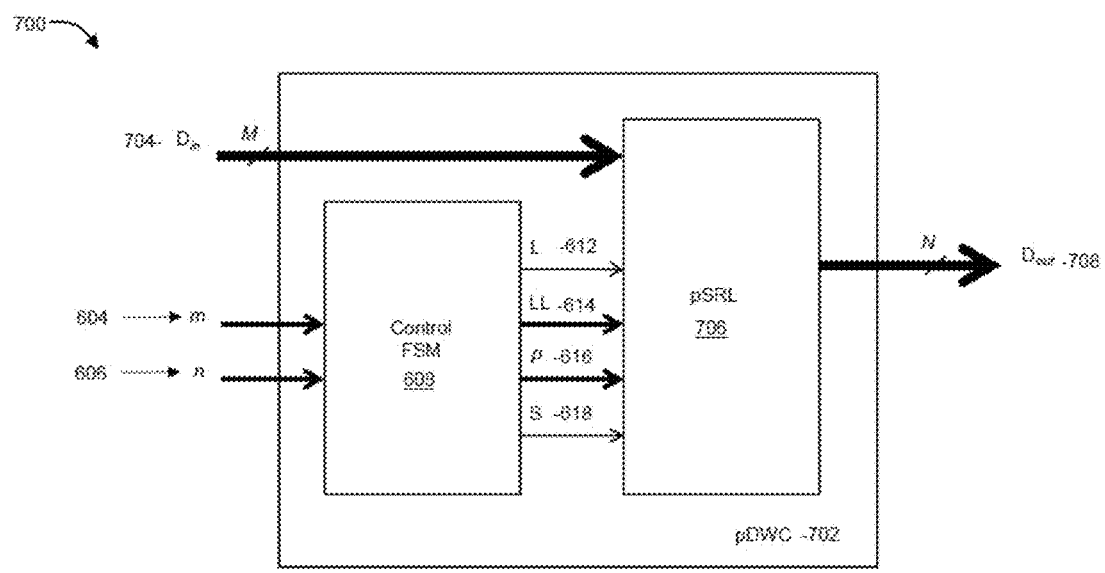
FIG. 7 illustrates an exemplary block diagram of a proposed programmable data width converter (pDWC), in accordance with an embodiment of the present invention.

FIG. 7 illustrates an exemplary block diagram of a programmable data width converter (pDWC). The pDWC 702 includes a control finite state machine (FSM) module 608 communicably coupled with a programmable shift register with programmable load location (pSRL) 706.

In an exemplary embodiment, the control finite state machine (FSM) module 608 is configured to maintain a record (count) of remaining partial data (words) from the data ($D_{in}$) of a load register having a data width (M). The FSM module 608, upon receipt of the record (count) of remaining partial data (words), can be configured to generate an output to control at least one of loading (L) of data 612, load location (LL) of data 614, a programmable shift value (p) 616, and a shifting (S) of data 618.

In an exemplary embodiment, loadable programmable shift register with programmable load location (pSRL) 706 receives the output of the FSM module 608 and data from a load register having a data width (M) 704. Upon receipt of the inputs, the pSRL 706 can be configured to convert data received from the load register having fixed data width (M) or variable data width (m) to a new fixed data width (N) or to a new variable data width (n) based on the received output.

In an exemplary embodiment, the loadable programmable shift register with programmable load location (pSRL) 706 includes a programmable load location input configurable with a value that defines a location of data to be loaded in the pSR based at least on an output generated by the control finite state machine (FSM) module.

In an exemplary embodiment, the loadable programmable shift register with programmable load location (pSRL) 706 includes a bit re-mapper module configured to shift out a programmable number of bits from a storage of the pSR based at least on an output generated by the control finite state machine (FSM) circuitry. In another exemplary embodiment, the bit re-mapper module is configured to load storage of the pSR, upon shifting of the programmable number of bits, with a fixed number of bits at a variable load location.

The working of pDWC 702 can be explained with below example.

Example 1 pDWC for m=7, n=5
Let us assume M=8 and N=7
Thus, the pSRL is configured with a width of 15. (W=15).
Load register width=8; δ width=15
Naturally, some bits of the load register will be discarded when LL>8.

In cycle 0, the FSM loads one 7-bit word into the pSRL. This is loaded at LL=1.

In cycle 1, the FSM initiates a load with L=1 and also initiates a shift with S=1. The FSM computes that (W−C)=8, and (m−n)=2 which is lesser, so it initiates a load. The FSM computes that C=7, which is greater than n, which is 5.

In cycle 2, after one shift and one load, C increases to 9, and the free space decreases by 2 to 6, but this is still greater than (m−n), which is 2, so the FSM performs a load. Since the bit count C=9 is greater than the number of bits to be shifted out n=5, the FSM also performs a shift. This state allows for concurrent load and shift again . . . . (Cycles 3 and 4 are similar).

In cycle 5, C increases to 15. The free space decreases to 0, which is less than (m−n), which is 2, so the FSM cannot perform a load. Since the bit count C=15 is greater than the number of bits to be shifted out n=5, the FSM does perform a shift.

In cycle 6, (W−C)=5, which is more than (m−n), which is 2; so L=1. There are enough bits to shift: (C>n), so S=1.

In cycle 7, (W−C)=3, which is more than (m−n), which is 2; so L=1. There are enough bits to shift: (C>n), so S=1.

In cycle 8, (W−C) reduces to 1; which prevents a load. There are enough bits for a shift so the FSM does initiate a shift. This is the second cycle in which there is a shift but no load.

In cycle 9, the state of data in the pSRL is the same as it was in cycle 2 and after this, things repeat in this 7-cycle loop.

Figure 8A:
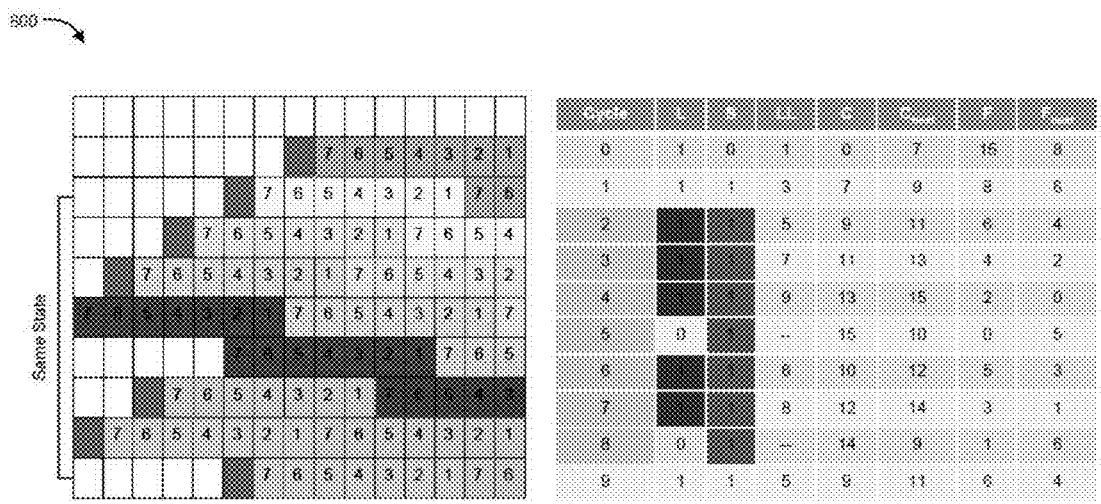
FIG. 8A illustrates an exemplary working of the proposed pDWC with m=7 and n=5, in accordance with an embodiment of the present invention.

In 7 cycles, there are exactly 5 loads of 7 bits and 7 shifts of 5 bits for a transfer of 35 bits. FIG. 8A illustrates that in 7 cycles, there are 5 loads (of 7 bits each) and 7 shifts (of 5 bits each). The dark colored boxes show how 8 bits are actually loaded and how the eighth bit of the previous load is discarded when a new 7-bit word is loaded.

Example 2 pDWC for m=5, n=7
Let's assume that M=8 and N=7
Thus, the pSRL is configured with a width of 15. (W=15)
Load register width=8; δ width=15.
Naturally, some bits of the load register will be discarded when LL>10.

In cycle 0 and cycle 1, the FSM loads two 5-bit words into the pSRL. The first one is loaded at LL=1, and the second at LL=1+m=6. Two 5-bit words are needed since n=7.

In cycle 2, the FSM initiates shifts with S=1. The FSM computes that C=10 in this cycle since in cycle 1, C=5, L=1 and S=0. Since C>n, a shift is initiated. However, since (W−C)=5, and this is greater than (m−n)=−2, a load is simultaneously initiated as well.

In cycle 3, after a simultaneous load and shift, C=10+5−7=8, and the free space is 15−8=7. This is greater than (m−n), which is −2, so the FSM performs a load. Since the bit count C=8 is greater than the number of bits to be shifted out n=5, the FSM also performs a shift. Note: Since (m−n)=−2, there never will be a condition when (W−C) is less than this; therefore on every clock, the FSM will perform a load.

In cycle 4, after a concurrent shift and load, the bit count C increases by (m−n)=−2 to become 6. At this point (W−C)=9, which is still greater than (m−n) which is −2; so the FSM does a load. However, since C<n, (6<7), the FSM does not initiate a shift. Continuing, in cycle 5, C increases to 11, (W−C)=4 and (m−n)=−2, so L=1. Also C>n, so S=1. Thus, cycle 5 also has concurrent load and shift . . . . (Cycles 6 and 7 are similar). This continues until cycle 8, which also has a load but no shift. The state of data in the pSRL is the same in cycle 9 as it was in cycle 2. After this, things repeat in this 7-cycle loop.

Figure 8B:
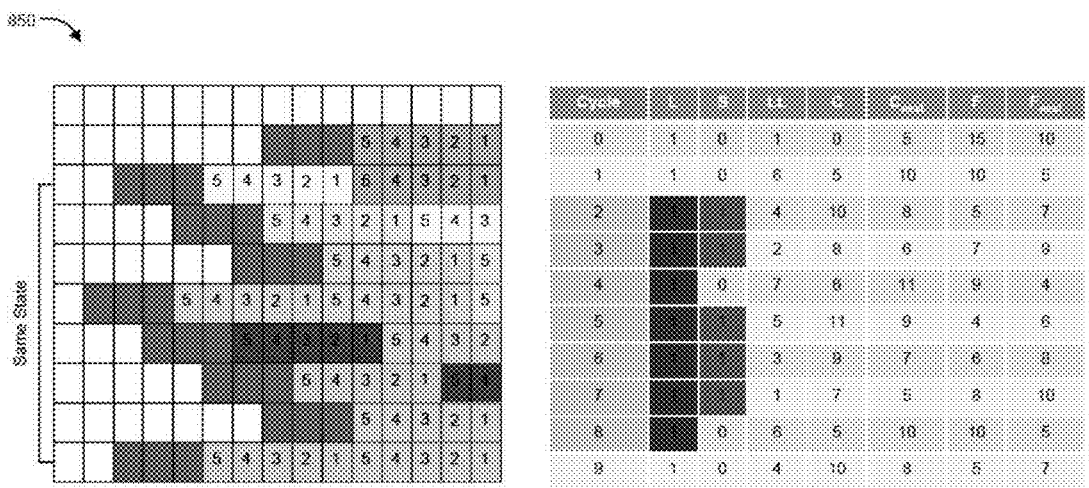
FIG. 8B illustrates an exemplary working of the proposed pDWC with m=5 and n=7, in accordance with an embodiment of the present invention.
Figure 8:
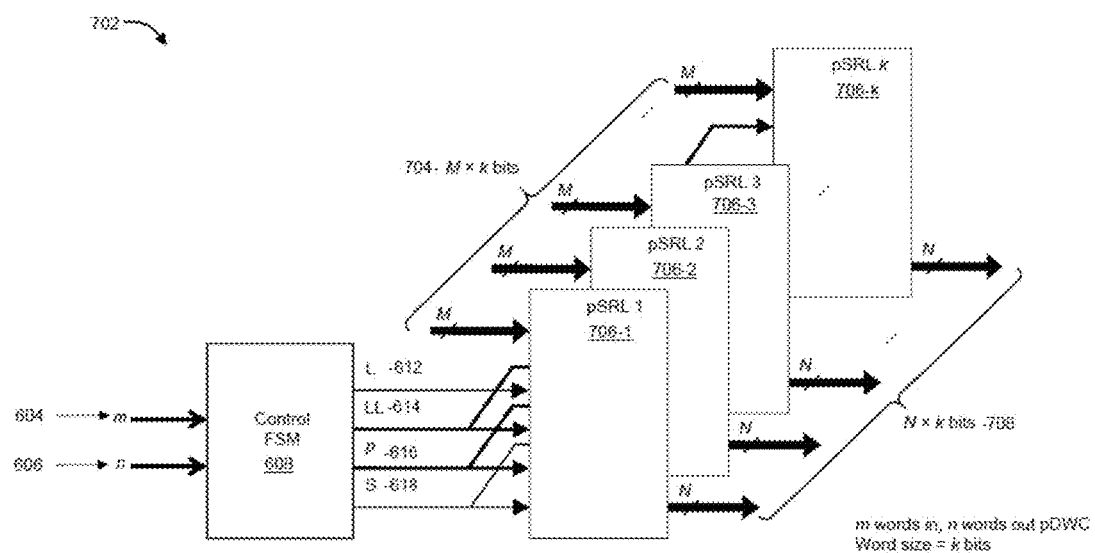

In 7 cycles, there are exactly 7 loads of 5 bits and 5 shifts of 7 bits for a transfer of 35 bits. FIG. 8B illustrates there are 7 loads (of 5 bits each) and 5 shifts (of 7 bits each). FIG. 8B shows how 8 bits are actually loaded and how the leftmost three bits of the previous load are discarded when a new 5-bit word is loaded.

FIG. 9 illustrates an exemplary block diagram of a multi-bit programmable data width converter (pDWC). In an embodiment, a multi-bit pDWC is required when, instead of single bits, operation of a pDWC is in bit multiples, for instance, when one wants to write m bytes at a time and read out n bytes at a time, wherein, in the implementation of FIG. 9, k=8.

In exemplary implementation, a proposed system can incorporate a pDWC with byte (8-bit) operation, which multi-bit operation is often required in protocol framers and de-framers. JESD204B Transport Layer Framer/De-Framer can be an example for the requirements of multi-bit pDWC. JESD204B needs pDWC operation in terms of "samples" that could be upto 32 bits. In an example, when one application requires M=N=64 samples, each sample can be defined to be 32 bits. In another example, the number of sample bits can be referred to as 'k'.

In an exemplary embodiment, it is possible to implement a k-bit pDWC by simply using a large pSRL and allowing m and n to only be an integral multiple of the word size k. But another solution can be to operate k single-bit pSRLs in parallel with a single control FSM controlling all pSRLs in lock step as illustrated in FIG. 9. This needs no more than (k×(M+N)) flops to implement. As illustrated in FIG. 9, the input is m words in and n words out of pDWC wherein the word size is k bits.

Figure 10:
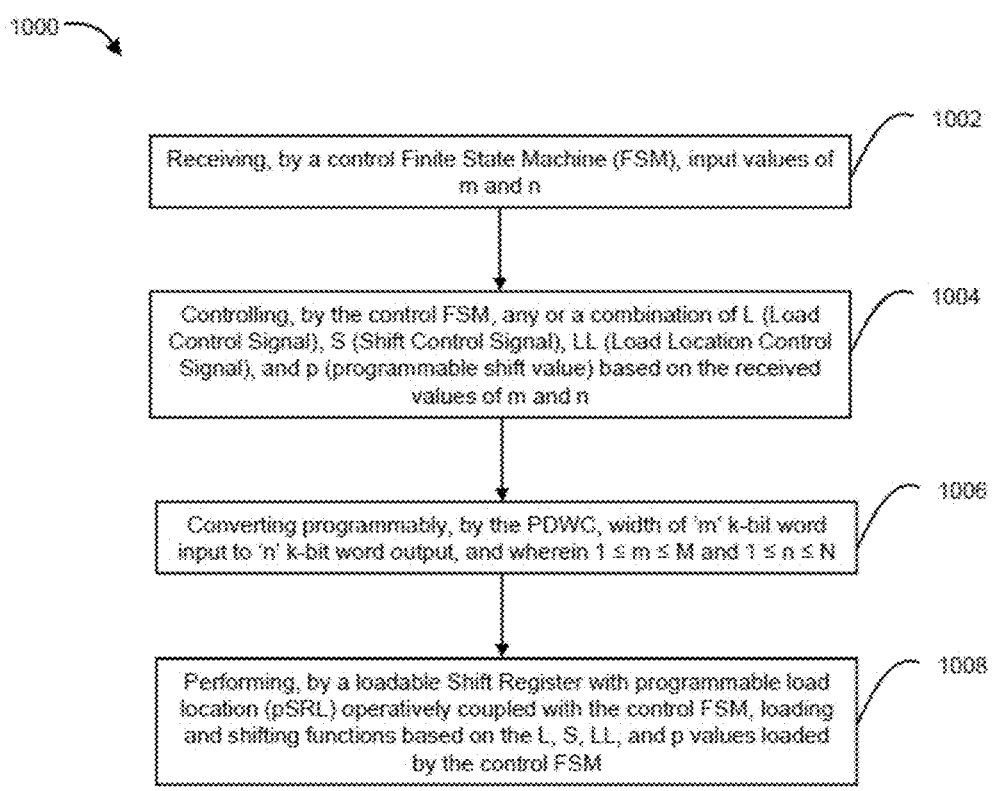
FIG. 10 illustrates an exemplary method performed by the proposed programmable data width converter (pDWC), in accordance with an embodiment of the present invention.

FIG. 10 illustrates an exemplary method performed by the proposed programmable data width converter (pDWC), in accordance with an embodiment of the present invention. In an embodiment, FIG. 10 illustrates a method for programmably converting width of m k-bit word input into n k-bit word output by a programmable data width converter (pDWC).

At step 1002, a control Finite State Machine (FSM) receives input values of m and n.

At step 1004, any or a combination of L (Load Control Signal), S (Shift Control Signal), LL (Load Location Control Signal), and p (programmable shift value) is controlled by the FSM based on the received values of m and n.

At step 1006, width of 'm' k-bit word input to k-bit word output, and wherein $1 \leq m \leq M$ and $1 \leq n \leq N$ is programmably converted by the pDWC.

At step 1008, loading and shifting functions based on the L, S, LL, and p values loaded by the control FSM are performed by a loadable programmable shift register with programmable load location (pSRL). In an embodiment, the loadable programmable shift register with programmable load location (pSRL) is operatively coupled with the control FSM.

Although the proposed system has been elaborated as above to include all the main modules, it is completely possible that actual implementations may include only a part of the proposed modules or a combination of those or a division of those into sub-modules in various combinations across multiple devices that can be operatively coupled with each other, including in the cloud. Further the modules can be configured in any sequence to achieve objectives elaborated. Also, it can be appreciated that proposed system can be configured in a computing device or across a plurality of computing devices operatively connected with each other, wherein the computing devices can be any of a computer, a laptop, a smartphone, an Internet enabled mobile device and the like. All such modifications and embodiments are completely within the scope of the present disclosure.

As used herein, and unless the context dictates otherwise, the term "coupled to" is intended to include both direct coupling (in which two elements that are coupled to each other or in contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While some embodiments of the present disclosure have been illustrated and described, those are completely exemplary in nature. The disclosure is not limited to the embodiments as elaborated herein only and it would be apparent to those skilled in the art that numerous modifications besides those already described are possible without departing from the inventive concepts herein. All such modifications, changes, variations, substitutions, and equivalents are completely within the scope of the present disclosure. The inventive subject matter, therefore, is not to be restricted except in the spirit of the appended claims.

TECHNICAL ADVANTAGES OF pDWC

The present disclosure provides a pDWC that allows reading of an n-bit output word as soon as it becomes available, which achieves the lowest theoretically possible latency.

The present disclosure provides a pDWC that is implementable in (M+N) bits of storage, $(M+N) \geq (N+1):1$ multiplexers and some gates to generate $p_i'$ in addition to a few flops and gates to implement the control FSM.

The present disclosure provides a pDWC that enables achievement of high performance due to highly optimized structural implementation and can operate at high speed.

The present disclosure provides a pDWC that is scalable in nature such that the pDWC scales linearly, making large values of W (size of pDWC) possible.

The present disclosure provides a FSM, size of which does not increase significantly even if M, N, and k become very large, and therefore size of FSM stays a very small part of the overall size.

We claim:

1. A programmable data width converter (pDWC) comprising:
   a control Finite State Machine (FSM) configured to receive input values of m and n, and control any or a combination of L (Load Control Signal), S (Shift Control Signal), LL (Load Location Control Signal), and p (programmable shift value) based on the received values of m and n, wherein the pDWC is configured to programmably convert width of 'm' k-bit word input to 'n' k-bit word output, and wherein $1 \leq m \leq M$ and $1 \leq n \leq N$; and
   a loadable programmable shift register with programmable load location (pSRL) operatively coupled with the control FSM, wherein the pSRL is configured to perform loading and shifting functions based on the L, S, LL, and p values loaded by the control FSM.

2. The converter of claim 1, wherein the pSRL is loaded based on value of the LL and by setting L=1, and wherein the pSRL is shifted by setting S=1 in a manner such that data is loaded in m bits and read out in n bits.

3. The converter of claim 1, wherein the pSRL is at least M+N bits wide.

4. The converter of claim 1, wherein the p is equal to n.

5. The converter of claim 1, wherein the load register width is M bits, and wherein m bits of said load register are used.

6. The converter of claim 1, wherein the control FSM loads at least n bits into the pSRL that has width W where W≥(M+N), and wherein if m>n, only one load is required, else if m<n, multiple load cycles are required with S=0.

7. The converter of claim 6, wherein the control FSM keeps a count C of bits that are currently in the pSRL, wherein each load increments the C by m such that when C≥n has been loaded into the pSRL, the control FSM initiates a shift that shifts out n bits and decrements C by n, and wherein when a load and shift happen together, (m−n) is added to C, and wherein whenever a free space exists in the pSRL as defined by (W−C)≥(m−n), the control FSM performs a load cycle, and wherein when L=S=1, loading happens while shifts are going on.

8. The converter of claim 1, wherein the pDWC is a k-bit pDWC with the control FSM being operatively coupled with either a large pSRL allowing m and n to be integral multiples of k, or being operatively coupled to control k single-bit pSRLs in parallel.

9. The converter of claim 8, wherein the pDWC requires a minimum of or equal to k×(M+N) number of flops.

10. The converter of claim 1, wherein the pSRL is any of a right shift register or a left shift register.

11. The converter of claim 1, wherein the LL defines where data D is loaded.

12. A method for programmably converting width of m k-bit word input into n k-bit word output by a programmable data width converter (pDWC), said method comprising:

receiving, by a control Finite State Machine (FSM), input values of m and n;

controlling, by the control FSM, any or a combination of L (Load Control Signal), S (Shift Control Signal), LL (Load Location Control Signal), and p (programmable shift value) based on the received values of m and n;

converting programmably, by the pDWC, width of 'm' k-bit word input to 'n' k-bit word output, and wherein 1≤m≤M and 1≤n≤N; and performing, by a loadable programmable shift register with programmable load location (pSRL) operatively coupled with the control FSM, loading and shifting functions based on the L, S, LL, and p values loaded by the control FSM.

13. The method of claim 12, wherein if load and shift happen together, (m−n), is added to C.

* * * * *